United States Patent [19]

Sakuragi

[11] Patent Number: 4,893,258

[45] Date of Patent: Jan. 9, 1990

[54] DATA PROCESSING APPARATUS HAVING ENLARGEMENT/REDUCTION FUNCTIONS CAPABLE OF SETTING DIFFERENT MAGNIFICATION IN DIFFERENT DIRECTIONS

[75] Inventor: Hiroshi Sakuragi, Tokyo, Japan

[73] Assignee: Kabushiki Kaisha Toshiba, Kawasaki, Japan

[21] Appl. No.: 149,222

[22] Filed: Jan. 27, 1988

[30] Foreign Application Priority Data

Jan. 28, 1987 [JP] Japan .................................. 62-15962

[51] Int. Cl.⁴ .......................... G06F 15/20; H04N 1/04
[52] U.S. Cl. .................................... 364/521; 358/451; 382/44; 382/47
[58] Field of Search ............................... 364/518-522; 382/44-47; 358/222, 287, 77

[56] References Cited

U.S. PATENT DOCUMENTS

| | | | |
|---|---|---|---|
| 4,275,450 | 6/1981 | Potter ..................................... | 382/47 |
| 4,631,750 | 12/1986 | Gabriel et al. .................... | 382/44 X |
| 4,661,987 | 4/1987 | Anderson et al. ..................... | 382/47 |
| 4,672,464 | 6/1987 | Shida ................................ | 382/47 X |
| 4,686,580 | 8/1987 | Kato et al. ......................... | 382/47 X |
| 4,771,473 | 9/1988 | Sugiura .................................. | 382/47 |

Primary Examiner—Gary V. Harkcom
Assistant Examiner—H. R. Herndon
Attorney, Agent, or Firm—Finnegan, Henderson, Farabow, Garrett and Dunner

[57] ABSTRACT

A data processing apparatus has a function capable of setting different vertical and horizontal magnifications. Data corresponding to an image input by a scanner is temporarily stored in a page memory. The data stored in the page memory is read out by a central processing unit (CPU), and is enlarged/reduced at predetermined conversion ratios in X and Y directions by an enlarge/reduction circuit. The enlarged/reduced data is temporarily stored in a display memory, and is displayed on a cathode-ray tube (CRT) display by the CPU. When the conversion ratios in the X and Y directions are selected and designated by a keyboard so that the image displayed on the CRT display is enlarged/reduced in at least one of the X and Y directions, the data temporarily stored in the display memory is enlarged/reduced at independent conversion ratios in the X and Y directions by the enlarge/reduction circuit. The data which is enlarged/reduced at independent conversion ratios in the X and Y directions is temporarily stored again in the display memory, and is then displayed on the CRT display by the CPU.

22 Claims, 11 Drawing Sheets

DATA PROCESSING APPARATUS HAVING ENLARGEMENT/REDUCTION FUNCTIONS CAPABLE OF SETTING DIFFERENT MAGNIFICATION IN DIFFERENT DIRECTIONS

BACKGROUND OF THE INVENTION

This invention relates to a data processing apparatus and, more particularly, to a data processing apparatus having an enlargement/reduction functions capable of setting different magnifications in different directions.

In a conventional data processing apparatus, data, e.g., image data of a large amount of documents are optically read by a two-dimensional scanning device. The data read by the two-dimensional scanning device are displayed on a display device such as a CRT (cathode-ray tube) display. The image data displayed on the CRT display are subjected to rotation, enlargement, reduction, movement, extraction, or synthesis with other documents to be edited to obtain an objective document. The edited document is sequentially stored on a storage medium such as an optical disk, or is output in a visible state for an operator using an output apparatus such as a CRT display or a printer.

When a character or an image displayed on the CRT display is to be enlarged or reduced, the enlargement or reduction magnifications in the horizontal and vertical directions of the character or image are equal to each other. More specifically, an original character or image is equally enlarged or reduced to obtain a resultant character or image, and the shapes of the characters or images before and after the enlargement/reduction are similar to each other. For this reason, when an operator performs an edit operation of characters or images using the apparatus, the image cannot be displayed in an arbitrary area on the CRT display. This is because an image to be displayed on the CRT display can only be enlarged or reduced at equal horizontal and vertical magnifications.

SUMMARY OF THE INVENTION

Accordingly, it is an object of the present invention to provide a data processing apparatus, wherein a character or an image can be enlarged/reduced at different horizontal and vertical magnifications so as to be displayed on a CRT display, so that an edit operation of characters or images such as movement, extraction, or synthesis with other documents can be performed.

According to the present invention, there is provided a data processing apparatus comprising means for displaying data to be processed, first designating means for designating on amount of one of an enlarging and reducing magnification in the vertical direction of the data displayed on the displaying means, second designating means for designating an amount of one of an enlarging and reducing magnification in the horizontal direction of the data displayed on the displaying means, and means for changing the data displayed on the displaying means in accordance with the amount of one of the enlarging and reducing magnification in the vertical direction designated by the first designating means and the amount of one of the enlarging and reducing magnification in the horizontal direction designated by the second designating means.

It is another object of the present invention to provide a data processing apparatus that comprises means for inputting data to be processed, means for displaying the data input by the inputting means, first designating means for designating on amount of one of an enlarging and reducing magnification in the vertical direction of the data displayed on the displaying means, second designating means for designating an amount of one of an enlarging and reducing magnification in the horizontal direction of the data displayed on the displaying means, means for changing the data displayed on the displaying means in accordance with the amount of one of the enlarging and reducing magnification in the vertical direction designated by the first designating means and the amount of one of the enlarging and reducing magnification in the horizontal direction designated by said second designating means, and means for storing the data which are enlarged and reduced at the magnification.

It is still another object of the present invention to provide a data processing apparatus that comprises means for storing data corresponding to an image to be processed, means for displaying the data read out by the storing means, first designating means for designating on amount of one of an enlarging and reducing magnification in the vertical direction of the data displayed on the displaying means, second designating means for designating an amount of one of an enlarging and reducing magnification in the horizontal direction of the data displayed on the displaying means, means for changing the data displayed on the displaying means in accordance with the amount of one of the enlarging and reducing magnification in the vertical direction designated by the first designating means and the amount of one of the enlarging and reducing magnification in the horizontal direction designated by the second designating means, and means for printing an image corresponding to the data which are enlarged and reduced at individual magnification.

BRIEF DESCRIPTION OF THE DRAWINGS

These and other features of the present invention will become more apparent from the following detailed description of exemplary embodiments thereof, as illustrated in the accompanying drawings, in which:

FIGS. 3A, 3B, and 3C are views showing image data displayed on a CRT display at predetermined enlargement/reduction magnifications, in which FIG. 3A shows a state wherein original image data is enlarged to twice the original size in the horizontal direction and three times in the vertical direction, FIG. 3B shows a state wherein the original image data is reduced to ¼ in the horizontal direction and ⅓ in the vertical direction, and FIG. 3C shows a state wherein the original image data is reduced to ½ in the horizontal direction and is enlarged to three times the original size in the vertical direction;

DETAILED DESCRIPTION OF THE PREFERRED EMBODIMENTS

An embodiment of the present invention will be described with reference to the accompanying drawings.

Figure 1:
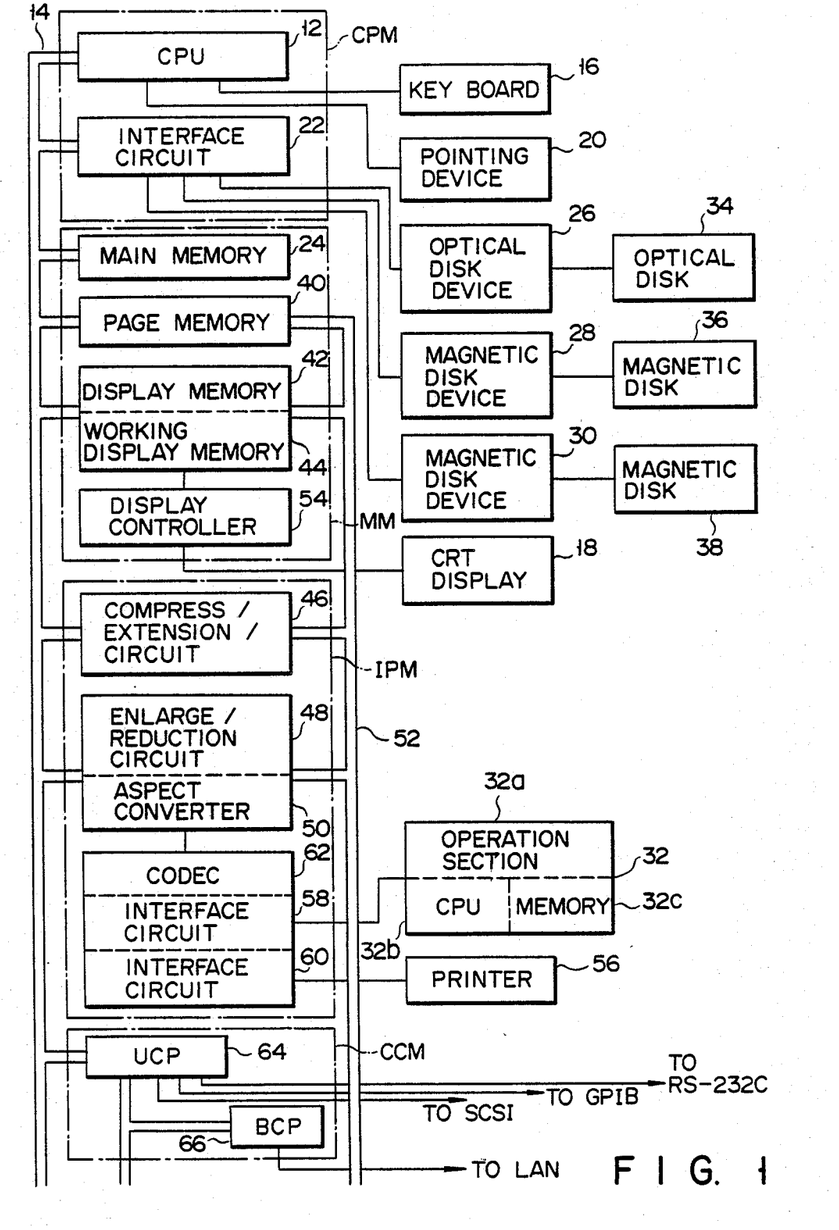
FIG. 1 is a block diagram schematically showing the entire arrangement of an image data processing apparatus according to an embodiment of the present invention.

FIG. 1 shows an image data file apparatus to which a data processing apparatus of the present invention is applied. CPU 12 as a control means is coupled to system bus 14 for control signals. CPU 12 controls the entire apparatus. CPU 12 is coupled to keyboard 16 for inputting various data such as a retrieval code corresponding to each image data, command data, and the like, and pointing device 20 (called a mouse) for moving a cursor displayed on CRT display 18 (to be described later in detail).

System bus 14 is coupled to interface circuit 22 for disk devices, and main memory 24 which stores operation programs of CPU 12. Interface circuit 22 is coupled to optical disk device 26 for storing image data, and magnetic disk devices 28 and 30 for storing retrieval information of optical disk device 26. Optical disk device 26 causes optical disk 34 used as an optical storage medium to sequentially store image data read by two-dimensional scanning device (scanner) 32 (to be described later) and supplied via CPU 12.

Magnetic disk device 28 causes magnetic disk 36 to store a retrieval code input from keyboard 16 and retrieval data controlled by a memory address on optical disk 34 storing each image data and its size corresponding to the retrieval code for each image data. The retrieval data is constituted by a retrieval code (image name) consisting of a plurality of retrieval keys, an image storage start track address, an image storage start sector address, and the number of image storage sectors (length of image) of image data corresponding to the retrieval code on optical disk 34. Magnetic disk device 28 comprises, e.g., a hard disk device. Magnetic disk device 30 stores a property sheet, and loads magnetic disk 38 which is processed by a personal computer or a word processor. Magnetic disk 38 comprises, e.g., a floppy disk.

System bus 14 is coupled to page memory 40 having a storage capacity corresponding to image data for a plurality of originals, display memory 42, working display memory 44, compress/extension circuit 46 for performing compression (reducing a redundancy) and extension (restoring a reduced redundancy), enlarge/reduction circuit 48 for enlarging/reducing image data, and aspect converter 50 for performing a vertical-horizontal conversion of image data. These sections are coupled between system bus 14 and image bus 52.

Display memory 42 stores image data which is obtained such that the image data to be actually displayed on CRT display 18, i.e., image data stored in page memory 40, is subjected to enlargement, reduction, rotation, insertion, movement, or white-black inversion. Enlarge/reduction circuit 48 and aspect converter 50 are arranged in a single module. Display memory 42 is coupled to CRT display 18 via display controller 54.

CRT display 18 displays image data read by scanner 32 or image data read out from optical disk device 26. CRT display 18 can simultaneously display a maximum of four documents using four windows. More specifically, CRT display 18 can display, e.g., four vertically displayed image data, and an edit operation such as enlargement, reduction, rotation, scroll, and the like of image data can be independently performed in each window. In addition, a cursor on CRT display 18 is arbitrarily moved in horizontal and vertical directions by pointing device 20, and an instruction is made at a desired position, so that a display content of CRT display 18, where the cursor is located, is selected. Alternatively, the display content of CRT display 18 is selected using a tablet which has the same display contents. Note that the display contents include various modes such as enlargement, reduction, and the like, an image to be edited, an area to be extracted, icons, and the like.

Scanner 32 exposes and scans an original with a laser beam to obtain electrical signals corresponding to image data of the original. Scanner 32 comprises operation section 32a for setting the parameters (processing data) such as a size of an original to be read, an original density, a reading density, and the like, CPU 32b for controlling scanner 32, and memory 32c for storing the parameters set by operation section 32a. Image data read by scanner 32, image data read out from optical disk device 26, and image data read out from page memory 40 or display memory 42 can be output as a hard copy by printer 56. Scanner 32 and printer 56 are coupled to encoding/decoding circuit (CODEC) 62 via interface circuits 58 and 60, respectively. CODEC 62 and interface circuits 58 and 60 are arranged in a single module.

Furthermore, system bus 14 is coupled to universal communication processor (UCP) 64. UCP 64 serves as an interface for RS-232C, GPIB, and SCSI. UCP 64 is coupled to business communication processor (BCP) 66. BCP 66 serves as an interface for a local area network (LAN).

In the image data file apparatus with the above arrangement, CPU 12 and interface circuit 22 constitute control module CPM, and main memory 24, page memory 40, display memory 42, working display memory 44, and display controller 54 constitutes memory module MM. Furthermore, compress/extension circuit 46, enlarge/reduction circuit 48, aspect converter 50, interface circuits 58 and 60, and CODEC 62 constitute image processing module IPM, and UCP 64 and BCP 66 constitute a communication control module.

Figure 2:
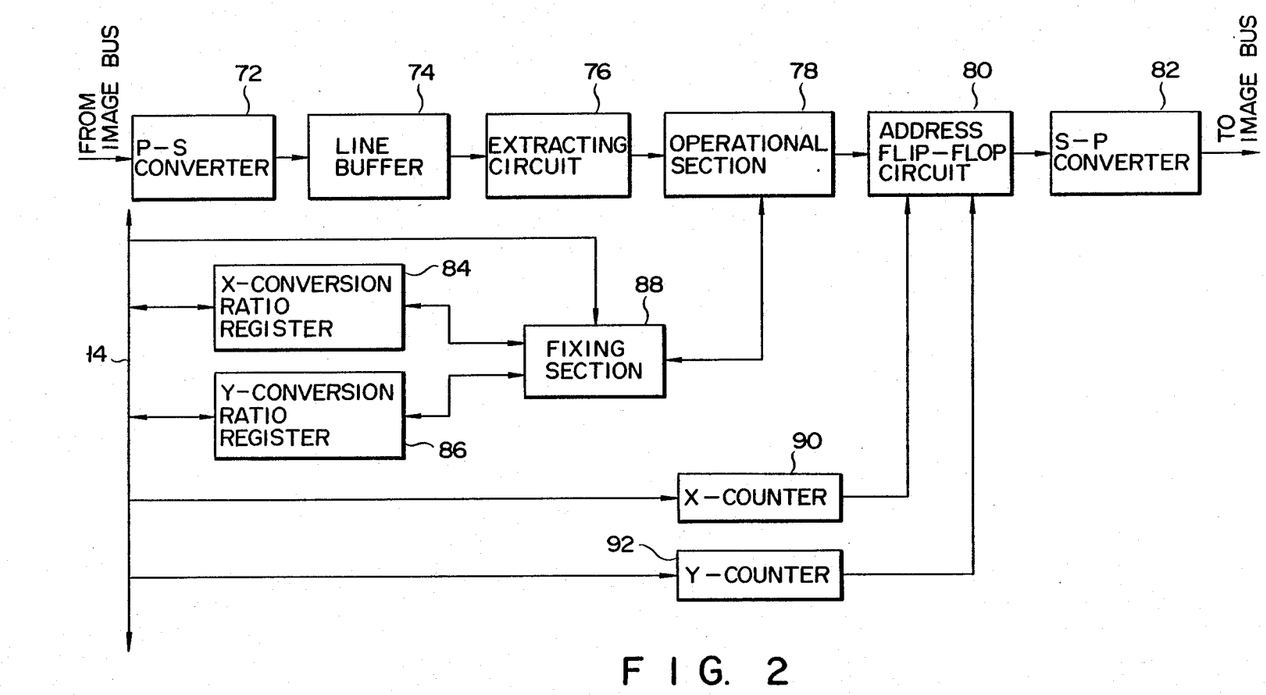
FIG. 2 is a block diagram showing an arrangement of an enlarge/reduction circuit of the apparatus shown in FIG. 1.

Enlarge/reduction circuit 48 will be described in detail with reference to FIG. 2. Enlarge/reduction circuit 48 enlarges/reduces a character pattern supplied by a pattern generator in CODEC 62 or image data supplied by page memory 40 or display memory 42 via image bus 52. Circuit 48 then outputs enlarged/reduced image data to page or display memory 40 or 42 via image bus 52. Enlarge/reduction circuit 48 comprises parallel-serial converter 72, line buffer 74, extracting circuit 76, operational section 78, address flip-flop circuit 80, serial-parallel converter 82, X-conversion ratio register 84, Y-conversion ratio register 86, fixing section 88, and X- and Y-counters 90 and 92.

Parallel-serial converter 72 converts the character pattern or image data supplied from image bus 52 into serial data, and outputs the converted serial data to line buffer 74. Line buffer 74 stores data for four lines. Extracting circuit 76 outputs, to operational section 78, 4 (line)×4 (column) pixels as reference pixels in accordance with the four line data supplied from line buffer 74. Operational section 78 performs an arithmetic operation in accordance with the reference pixels supplied by extracting circuit 76 and a position determination signal supplied by fixing section 88. With this arithmetic operation, section 78 outputs, to address flip-flop circuit 80, data indicating a position of a new dot and data indicating whether the position corresponds to a black or white signal.

Address flip-flop circuit 80 repetitively outputs data calculated by operational section 78 to serial-parallel converter 82 in accordance with outputs from X- and Y-counters 90 and 92. Serial-parallel converter 82 stores, for one line, the data indicating the position of the new dot and data indicating whether the position corresponds to the black or white signals, which are supplied from address flip-flop circuit 80, and outputs the one-line data to image bus 52 as enlarged or reduced data (parallel data).

X-conversion ratio register 84 stores a conversion ratio in the X direction (horizontal direction; first direction) supplied by system bus 14, and Y-conversion ratio register 86 stores a conversion ratio in the Y direction (vertical direction; second direction) similarly supplied by system bus 14. Fixing section 88 calculates a position of a pixel before a predetermined enlargement and/or reduction in accordance with the size of an original image supplied by system bus 14. Fixing section 88 then calculates a position of a pixel after the predetermined enlargement and/or reduction in accordance with the original pixel position, and X and Y conversion ratios supplied by X- and Y-conversion ratio registers 84 and 86. Fixing section 88 outputs a position determination signal indicating the calculated new pixel position to operational section 78.

Furthermore, a count value for determining how many times data calculated by operational section 78 is repetitively output is preset in X- and Y-counters 90 and 92. The outputs from X- and Y-counters 90 and 92 are supplied to address flip-flop circuit 80.

A case will be described wherein an image of an original read by scanner 32 is displayed on CRT display 18 and is then subjected to an edit operation such as enlargement and/or reduction.

Assume that an operator sets an original on scanner 32. Scanner 32 scans and two-dimensionally reads the original to convert it into image data. The image data is supplied to page memory 40 via image bus 52. Page memory 40 stores the image of the original read by scanner 32 while having an original size. The image data stored in page memory 40 is supplied to enlarge/reduction circuit 48 via image bus 52. In this case, CPU 12 determines an enlargement/reduction magnification in accordance with the size of the original which is read by scanner 32 and a size of a display portion of CRT display 18. The determination result, i.e., data indicating X and Y conversion ratios, the size of the original image, and a size of an enlarged or reduced image, are output to enlarge/reduction circuit 48 via system bus 14.

Enlarge/reduction circuit 48 reduces the image data supplied by system bus 14 to a size corresponding to CRT display 18, and outputs the reduced image data. More specifically, parallel-serial converter 72 of enlarge/reduction circuit 48 converts a character pattern or image data supplied by image bus 52 into serial data, and outputs the converted serial data to line buffer 74. When data for four lines are stored in line buffer 74, extracting circuit 76 outputs 4 (line)×4 (column) pixels as reference pixels to operational section 78 in accordance with the four lines data.

In this case, the X and Y conversion ratios supplied by CPU 12 via system bus 14 are respectively supplied to fixing section 88 via X- and Y-conversion ratio registers 84 and 86. Fixing section 88 calculates the positions of the pixels before enlargement or reduction in accordance with the size of the original image supplied from system bus 14. Fixing section 88 calculates the positions of the pixels after enlargement/reduction in accordance with the positions of original pixels, and X and Y conversion ratios supplied from X- and Y-conversion ratio registers 84 and 86. Then, fixing section 88 outputs position determination signals to operational section 78 indicating the positions of the new calculated pixels. X and Y count values supplied from CPU 12 via system bus 14 and indicating a size of an image when it is enlarged or reduced are respectively set in X- and Y-counters 90 and 92.

Figure 3A:
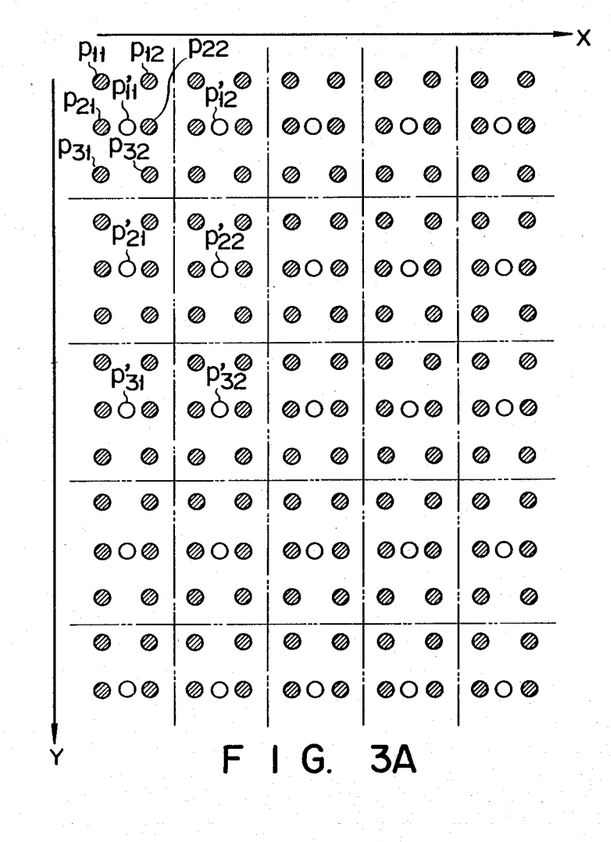
Figure 3B:
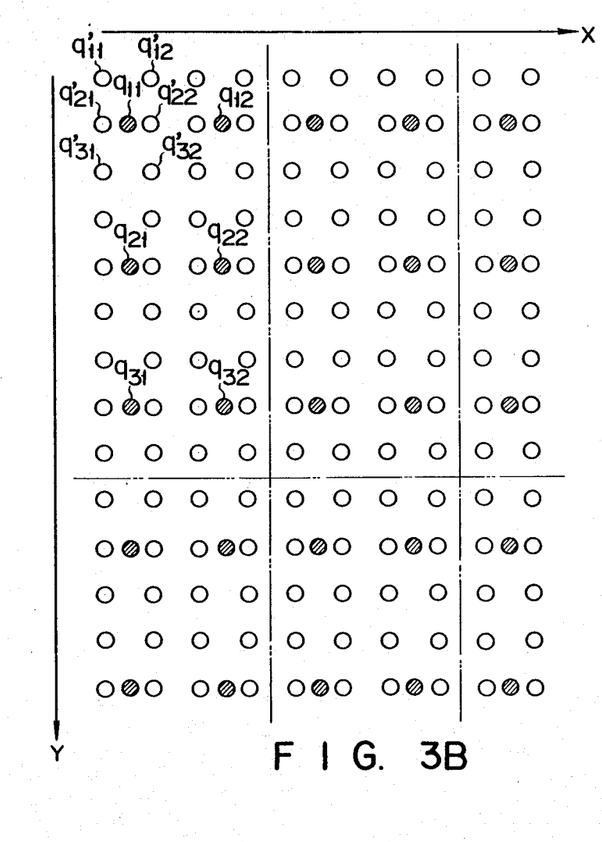
Figure 3C:
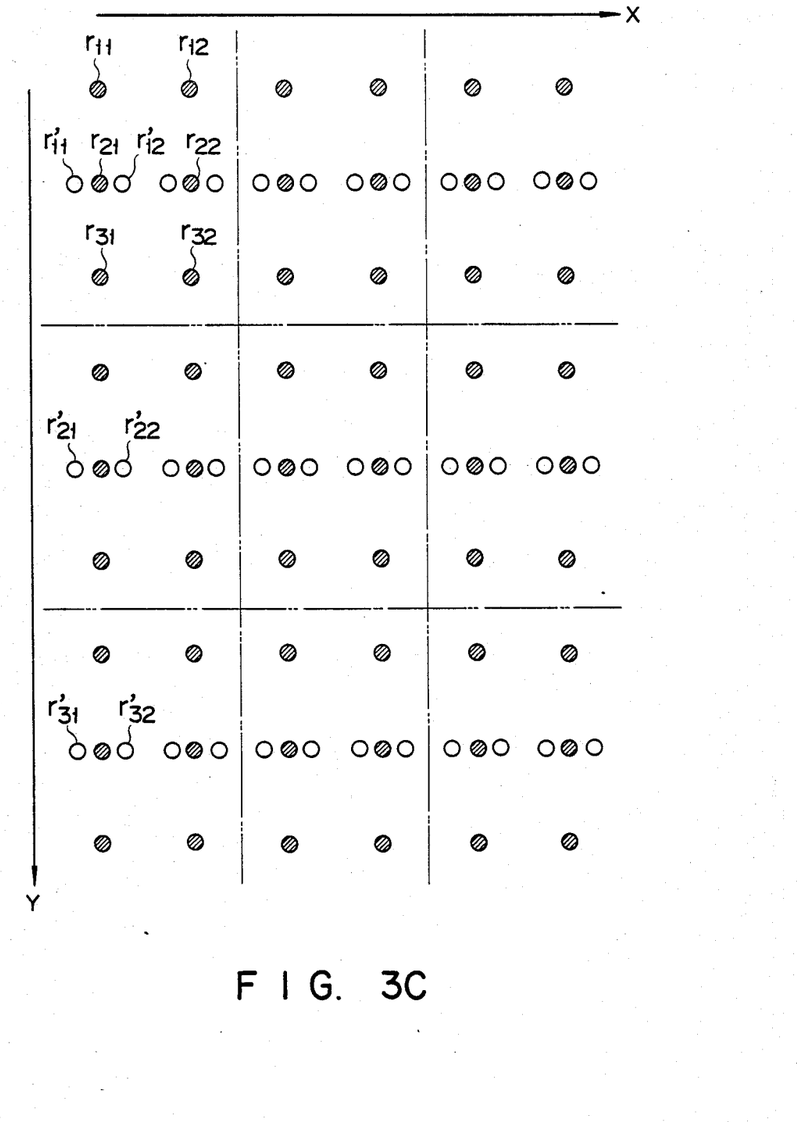

A case will be described wherein an original image is subjected to predetermined enlargement/reduction as shown in FIGS. 3A to 3C. In FIGS. 3A through 3C, hatched circles represent pixels before enlargement/reduction, and hollow circles represent pixels after enlargement/reduction.

FIG. 3A shows a case wherein an original image is enlarged to twice that of the original size in the horizontal direction (X direction) and three times that of the original size in the vertical direction (Y direction). In FIG. 3A, the abscissa and ordinate respectively indicate the horizontal (X) and vertical (Y) directions on CRT display 18. X and Y output image lengths are determined by X- and Y-counters 90 and 92. A pixel pitch is determined by the X and Y conversion ratios. More specifically, in FIG. 3A, an image is enlarged to twice the size of the original in the X direction and to three times the size of the original in the Y direction while taking pixels p11, p12, p21, p22, p31, and p32 into consideration. The X and Y conversion ratios supplied by CPU 12 are respectively "2" and "3". These conversion ratios and the size of the original image supplied by system bus 14 are supplied to fixing section 88 so as to calculate the positions of pixels p11, p12, . . . , before enlargement. Then, the positions of pixels, the intervals between which has been increased twice the original interval in the X direction and three times the original interval in the Y direction, are calculated from the original positions of pixels p11, p12, . . . and X and Y conversion ratios "2" and "3" supplied by X- and Y- conversion ratio 84 and 86. More specifically, pixels p11, p12, p21, p22, p31, and p32 are enlarged to twice the original size in the X direction and to three times the original size in the Y direction, and are displayed at positions of p'11, p'12, p'21, p'22, p'31, and p'32 (this also applies to other pixels). In this manner, position determination signals indicating the positions of pixels of the image, which are enlarged to twice the size in the lateral direction and three times the size in the vertical direction with respect to the original image, are supplied to operational section 78. Meanwhile, X and Y count values "2" and "3" are set in X- and Y-counters 90 and 92.

As a result, operational section 78 performs an arithmetic operation in accordance with reference pixels (4×4 pixels) supplied by extracting circuit 76 and the position determination signal supplied by fixing section 84. Then, section 78 outputs, to address flip-flop circuit 80, data indicating the positions of new dots.

Section 78 also outputs data indicating whether the positions of the new dots correspond to black or white signals. Each pixel after enlargement is determined to be black when more black pixels surround it than white pixels do, or to be white when more white pixels surround it than white pixels do. However, any pixel located at the four sides of CRT display 18 is determined to be white since all pixels surrounding it are considered to be white.

In this manner, address flip-flop circuit 80 repetitively outputs, to serial-parallel converter 82, data calculated by operational section 78 in accordance with the data output from X- and Y-counters 90 and 92. Serial-parallel converter 82 stores, for one line, data indicating positions of the new dots and data indicating whether the positions correspond to black or white signals, which are supplied from address flip-flop circuit 80, and outputs the one-line data onto image bus 52 as enlarged data.

Therefore, reduced image data from enlarge/reduction circuit 48 is supplied to display memory 42 via image bus 52. Display memory 42 stores an original image read by scanner 32 to be reduced to a size corresponding to CRT display 18. The image stored in display memory 42 is displayed on CRT display 18 via display controller 54. The displayed image is enlarged to twice the size in the horizontal direction and to three times the size in the vertical direction with respect to the original image.

FIG. 3B shows a case wherein an original image is reduced to $\frac{1}{2}$ the size of the original in the horizontal direction and to $\frac{1}{3}$ the original size in the vertical direction. In the case of the reduction, the operation is basically the same as that in the enlargement processing as described above.

More specifically, an image is reduced to half the original size in the X direction, and to a third the original size in the Y direction. That is, as is shown in FIG. 3B, the interval between pixels q11 and q12, the interval between pixels q21 and q22, and the interval between pixels q31 and q32 are reduced to half the original interval, whereas the intervals among pixels q11, q21 and q31, and the intervals among pixels q12, q22 and q32 are decreased to a third the original intervals.

In this case, X and Y conversion ratios supplied by CPU 12 are respectively "$\frac{1}{2}$" and "$\frac{1}{3}$". These conversion ratios and the size of the original image supplied from system bus 14 are supplied to fixing section 88 so as to calculate the positions of pixels q11, q12, . . . , before their reduction. In addition, the interval among pixels which are reduced to $\frac{1}{2}$ in the X direction, and to $\frac{1}{3}$ in the Y direction are calculated in accordance with the positions of pixels q11, q12, . . . before reduction and X and Y conversion ratios "$\frac{1}{2}$" and "$\frac{1}{3}$" supplied from X- and Y-conversion ratio registers 84 and 86. That is, pixels q11, q12, q21, q22, q31, and q32 are reduced to $\frac{1}{2}$ in the X direction and $\frac{1}{3}$ in the Y direction and are displayed at positions of q'11, q'12, q'21, q'22, q'31, and q'32 (this also applies to other pixels). Position determination signals indicating the positions of pixels of an image, the interval among which is reduced to $\frac{1}{2}$ in the direction and to $\frac{1}{3}$ in the direction are supplied to operational section 78. X and Y count values "$\frac{1}{2}$" and "$\frac{1}{3}$" are respectively set in X- and Y-counters 90 and 92. The following processing is the same as that of the enlargement processing described above, and a detailed description thereof will be omitted.

FIG. 3C shows a case wherein an original image is reduced by $\frac{1}{2}$ in the horizontal direction and is enlarged to three times its original size in the vertical direction. In FIG. 3C, an image is reduced by $\frac{1}{2}$ in the X direction and is three times enlarged in the Y direction while taking pixels r11, r12, r21, r22, r31, and r32 into consideration. X and Y conversion ratios supplied from CPU 12 are respectively "$\frac{1}{2}$" and "3". These conversion ratios and the size of the original image supplied from system bus 14 are supplied to fixing section 88 so as to calculate the positions of pixels r11, r12, . . . before reduction/enlargement. Then, the positions of pixels which are reduced by $\frac{1}{2}$ in the X direction and are three times enlarged in the Y direction are calculated in accordance with the positions of pixels r11, r12, . . . before reduction/enlargement, and X and Y conversion ratios "$\frac{1}{2}$" and "3" supplied from X- and Y-conversion ratio registers 84 and 86. That is, pixels r11, r12, r21, r22, r31, and r32 are reduced by $\frac{1}{2}$ in the X direction and are three times enlarged in the Y direction, and are displayed at the positions of r'11, r'12, r'21, r'22, r'31, and r'32 (this also applies to other pixels). In this manner, position determination signals indicating the positions of pixels of the image which are reduced by $\frac{1}{2}$ in the horizontal direction and by three times in the vertical direction are supplied to operational section 78. X and Y count values "$\frac{1}{2}$" and "3" are respectively set in X- and Y-counters 90 and 92. The following processing is the same as that in the enlargement and reduction operations described above, and a detailed description thereof will be omitted. In this case, enlargement and reduction are simultaneously performed. However, the same operation is performed when enlargement or reduction is performed in only the horizontal or vertical directions.

A case will be described wherein in this image data file apparatus, an image displayed on CRT display 18 is synthesized and edited with another image by processing such as enlargement/reduction as described above.

Figure 4:
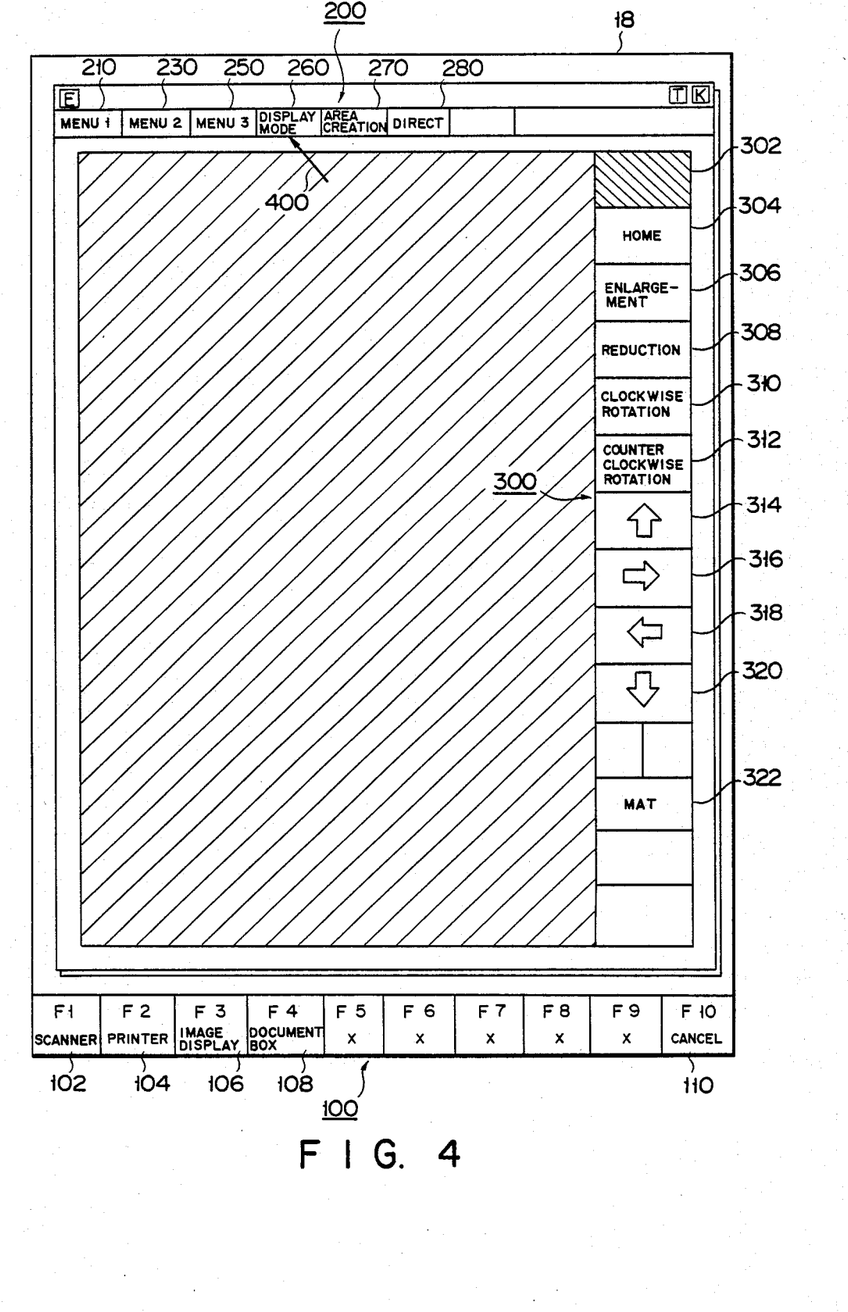
FIG. 4 shows a display state of the CRT display shown in FIG. 1, i.e., is a view showing an initial state of the CRT display.

CRT display 18 which is enabled when a power switch is turned ON (not shown), normally displays an initial screen (not shown) including various processing functions. In this display state, an image edit mode is selected and designated using pointing device 20 or keyboard 16. The screen of CRT display 18 is switched as shown in FIG. 4. The screen of CRT display 18 is displayed with, e.g., gray rasters, and common icons 100 for setting various processing functions, designation icons 200 and 300 for designating the processing of displayed image data, and cursor 400 for designating that these icons are displayed around the rasters. Common icons 100 include, e.g., scanner icon 102, printer icon 104, image display icon 106, document box icon 108, . . . , cancel icon 110, and the like, and designation icons 200 include menu 1 icon 210, menu 2 icon 230, menu 3 icon 250, display mode icon 260, area creation icon 270, and direct icon 280. Designation icons 300 include end display icon 302, home icon 304, enlargement icon 306, reduction icon 308, clockwise rotation icon 310, counterclockwise rotation icon 312, scroll icons 314, 316, 318, and 320 for scrolling the screen upward, downward, to the right, and to the left, mat icon 322, and the like. When end display icon 302 is selected, a displayed window indicates whether or not write or registration access is enabled. When end display icon 302 is ON (hatched state in FIG. 4), it indicates that the window can be enabled. Furthermore, home icon 304 restores an image in the window, and mat icon 322 indicates a mat to which an extracted part is pasted in the image edit mode.

Figure 5:
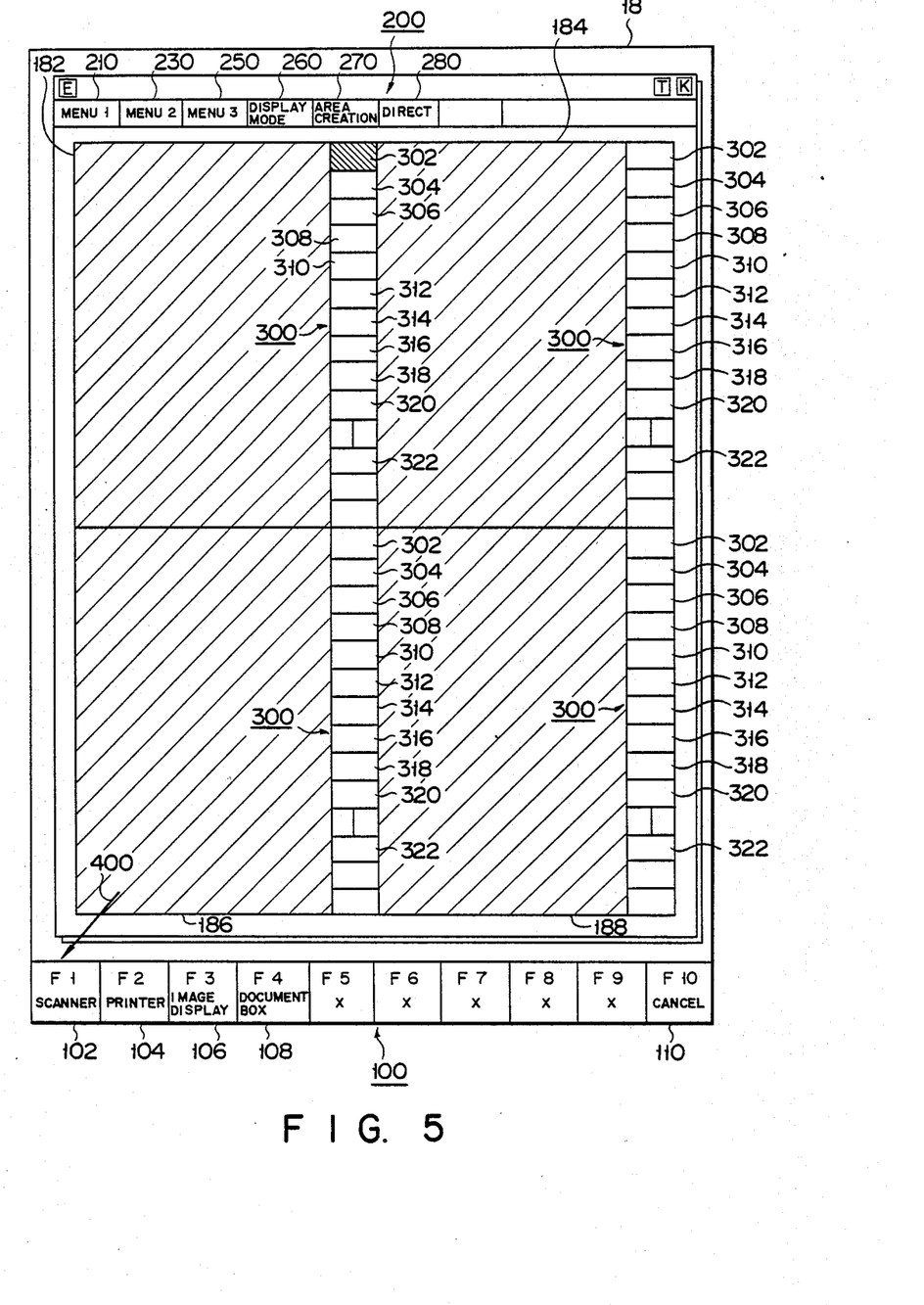
FIG. 5 shows a display state of the CRT display, i.e., is a view showing a 4-page display state (window 4)

In the display state shown in FIG. 4, pointing device 20 is operated to move cursor 400 displayed on the screen, and causes cursor 400 to designate display mode 260 of indication icons 200. For example, pointing device 20 is operated to select and designate a window 4 icon from window icons of a pull down menu (not shown) of display mode icon 260. As shown in FIG. 5, four windows 182, 184, 186, and 188 are displayed on CRT display 18. Designation icons 300 are respectively displayed on these windows 182 to 188. In FIG. 5, only end display icon 302 of window 182 is turned on. When a plurality of windows are displayed on CRT display 18, as shown in FIG. 5, end display icon 302 can be switched to an arbitrary window upon instruction from pointing device 20. Icon 302 can also be switched sequentially using a space key on keyboard 16.

In this display state, a predetermined original is set on scanner 32, and scanner icon 102 and image display icon 106 of common icons 100 are designated by cursor 400 on CRT display 18 in this order. The original set on scanner 32 is then read, and is displayed in window 182 whose end display icon 302 is turned on. As described above, pointing device 20 is operated to switch the end display from window 182 to window 184. Another original is set on scanner 32 and the same operation as described above is performed. Then, the read image is displayed in window 184. The read image is stored in an independent area of page memory 40. These images are reduced to a size corresponding to the size of each window (but similar to an A4 size) through enlarge/reduction circuit 48, and are stored in predetermined areas of display memory 42.

Figure 6:
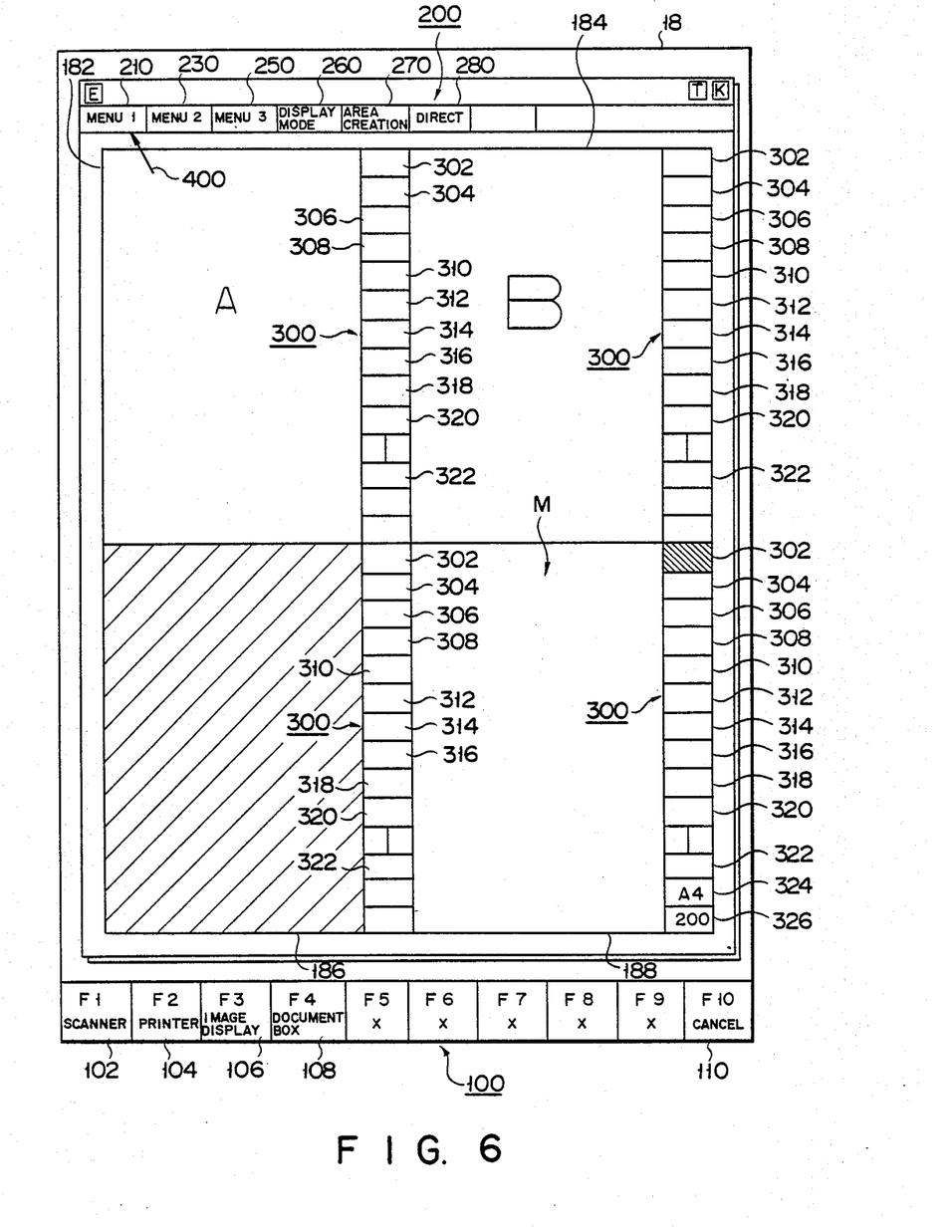
FIG. 6 shows a display state of the CRT display shown in FIG. 5, i.e., is a view showing a state capable of an edit operation.

When images displayed in windows 182 and 184 are edited on window 188 in a state wherein four windows 182 to 188 are displayed, mat M is set to allow editing on window 188. More specifically, mat icon 322 of designation icons 300 is selected and designated using cursor 400 by pointing device 20. CPU 12 reads out the property sheet stored in magnetic disk 38 to determine a mat size, a line density, and the like necessary for setting a mat. After mat M is set in a predetermined display state, white mat M is displayed on window 188, as shown in FIG. 6. In this case, icons 324 and 326 respectively designating mat size "A4" and line density "200" are displayed on designation icons 300 of window 188 on which mat M is displayed.

A case will be described wherein, as shown in FIG. 6, image "A" displayed on window 182 is enlarged to twice the original size in the horizontal direction and to three times in the vertical direction, image "B" displayed on window 184 is reduced to ½ in the horizontal direction and to ⅓ in the vertical direction, and these images are pasted to mat M on window 188 in a state wherein mat M is displayed on window 188.

Window 182 on which image "A" is displayed will be described. Pointing device 20 is operated to move cursor 400 on the screen and to select and designate enlargement icon 306 from designation icons 300. Horizontal and vertical, i.e., X and Y magnifications "2" and "3" of image "A" are input from keyboard 16. As described above, X and Y magnifications "2" and "3" are supplied from keyboard 12 to enlarge/reduction circuit 48 via CPU 12 and system bus 14. Magnifications "2" and "3" are supplied to X- and Y-conversion ratio registers 84 and 86 as conversion ratios, and to X- and Y-counters 90 and 92 as count values. Conversion ratios "2" and "3" are output from X- and Y-conversion ratio registers 84 and 86. Then, position determination signals indicating the positions after enlargement are output from fixing section 88 to operational section 78.

Image data of image "A" displayed on CRT display 18 is supplied from display memory 42 to parallel-serial converter 72 via image bus 52. The image data is output to operational section 78 through line buffer 74 and extracting circuit 76. Address flip-flop circuit 80 repetitively outputs, to serial-parallel converter 82, data calculated by operational section 78 in accordance with data output from X- and Y-counters 90 and 92. In this manner, the data output to serial-parallel converter 82 is supplied as enlarged data to display memory 42 via image bus 52. The enlarged image "A" stored in display memory 42 described above is displayed on window 182 on CRT display 18 via display controller 54, as shown in FIG. 7.

A reduction operation of image "B" displayed on window 184 is performed in substantially the same manner as in the case of image "A", except that magnifications (conversion ratios, count values) are different ("½" and "⅓") and not enlargement icon 306 of designation icons 300 but reduction icon 308 thereof is used, and a detailed description thereof will be omitted.

An edit operation wherein enlarged and reduced images "A" and "B" are patched up on window 188 from windows 182 and 184 will be described.

Figure 7:
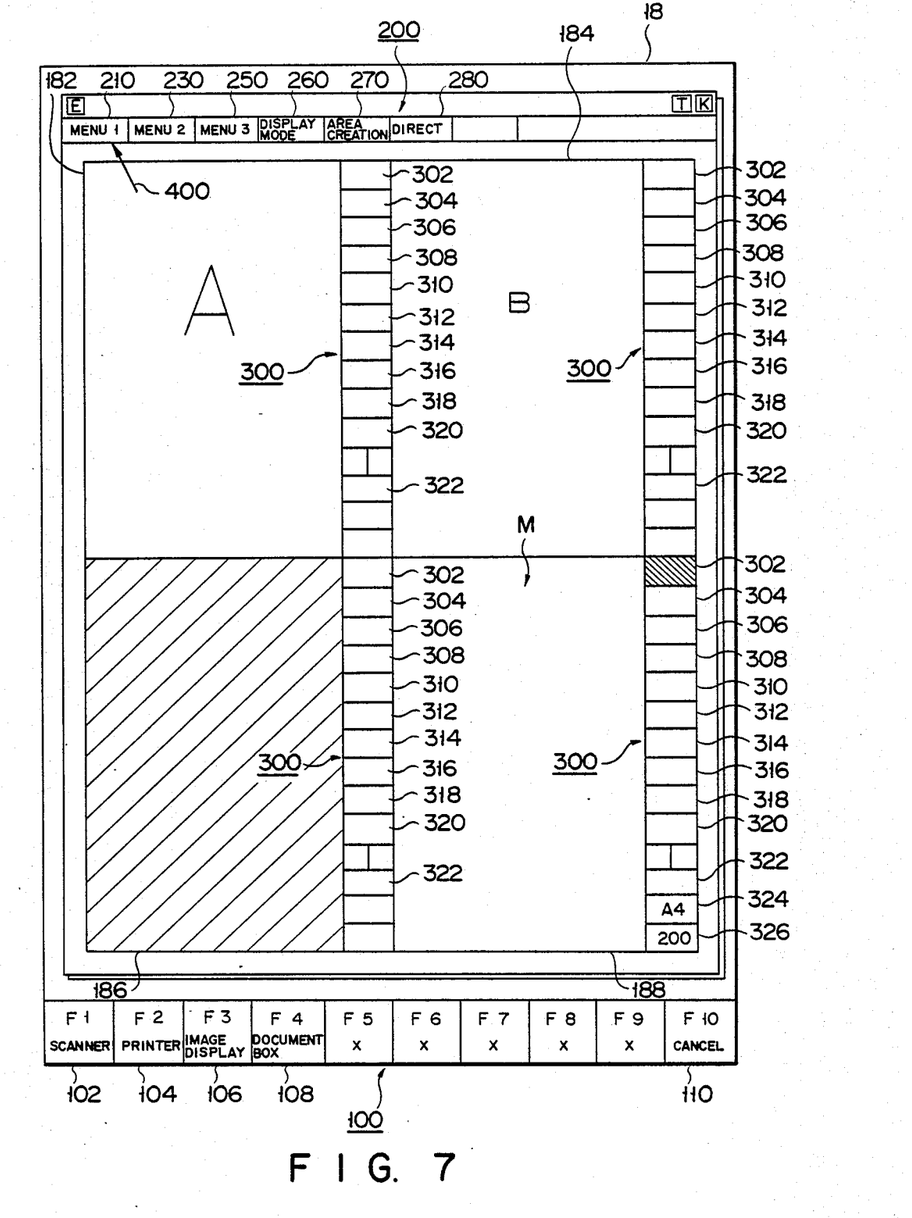
FIGS. 7, 8, and 9 show display states of the CRT display shown in FIG. 5, i.e., are views showing states during the edit operation.
Figure 8:
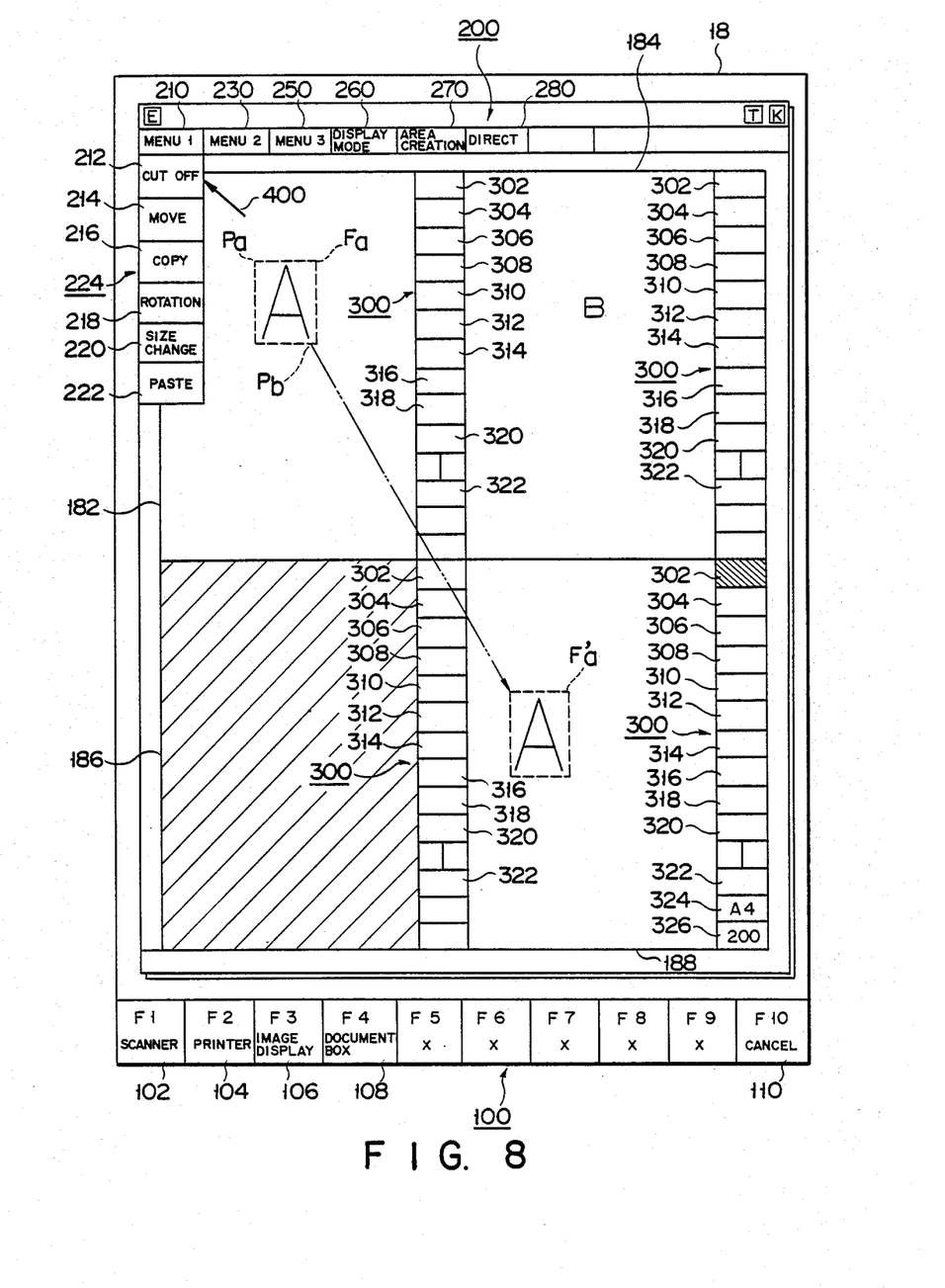

In FIG. 7, pointing device 20 is operated to move cursor 400 on the screen and to designate "menu 1" icon 210 from indication icons 100. For example, cursor 400 is then moved downward in FIG. 7 while an operation button attached to pointing device 20 is kept depressed. As shown in FIG. 8, pull down menu 224 including icons 212, 214, 216, 218, 220, and 222 designating functions of "cut off", "move", "copy", "rotation", "size change", and "paste" is displayed. Then, cursor 400 is moved while pull down menu 224 is displayed to designate icon 212 of "cut off". As shown in FIG. 8, point Pa located near image "A" displayed on window 182 is designated in advance by cursor 400, and point Pb is similarly designated. Rectangular frame Fa (dotted frame) having points Pa and Pb as diagonal points is then displayed. When frame Fa as a cut-off range of image "A" is designated by cursor 400 as described above, an image corresponding to frame Fa is read out onto page memory 40, and is stored in another area of memory 40.

Figure 9:
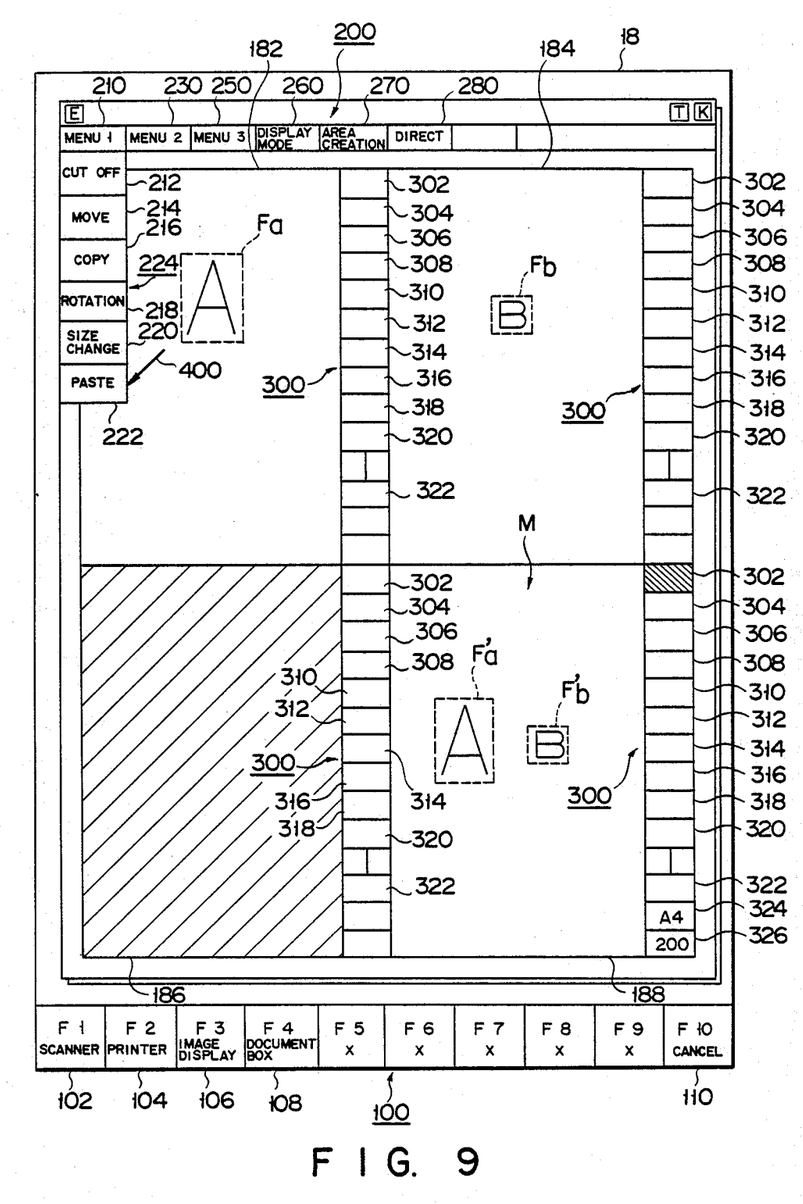

In this manner, rectangular frame Fa is displayed around image "A", and the image inside frame Fa is stored in page memory 40. Thereafter, icon 214 designating "move" is selected and designated (not shown) from pull down menu 224 by cursor 400. Then, frame Fa including image "A" is moved on the screen as cursor 400 is moved. Frame Fa is moved to a predetermined position of mat M, and after its position is determined, the operation button of pointing device 20 is operated. The same image as image "A" included in frame Fa displayed on window 182 is displayed as image "A" included in frame Fa' at the predetermined position in window 188. Similarly, image "B" included in frame Fb in window 184 is moved in window 188, and is displayed as image "B" included in frame Fb'. More specifically, images "A" and "B" in windows 182 and 184 are displayed in windows 188 together with frames Fa' and Fb', as shown in FIG. 9.

Figure 10:
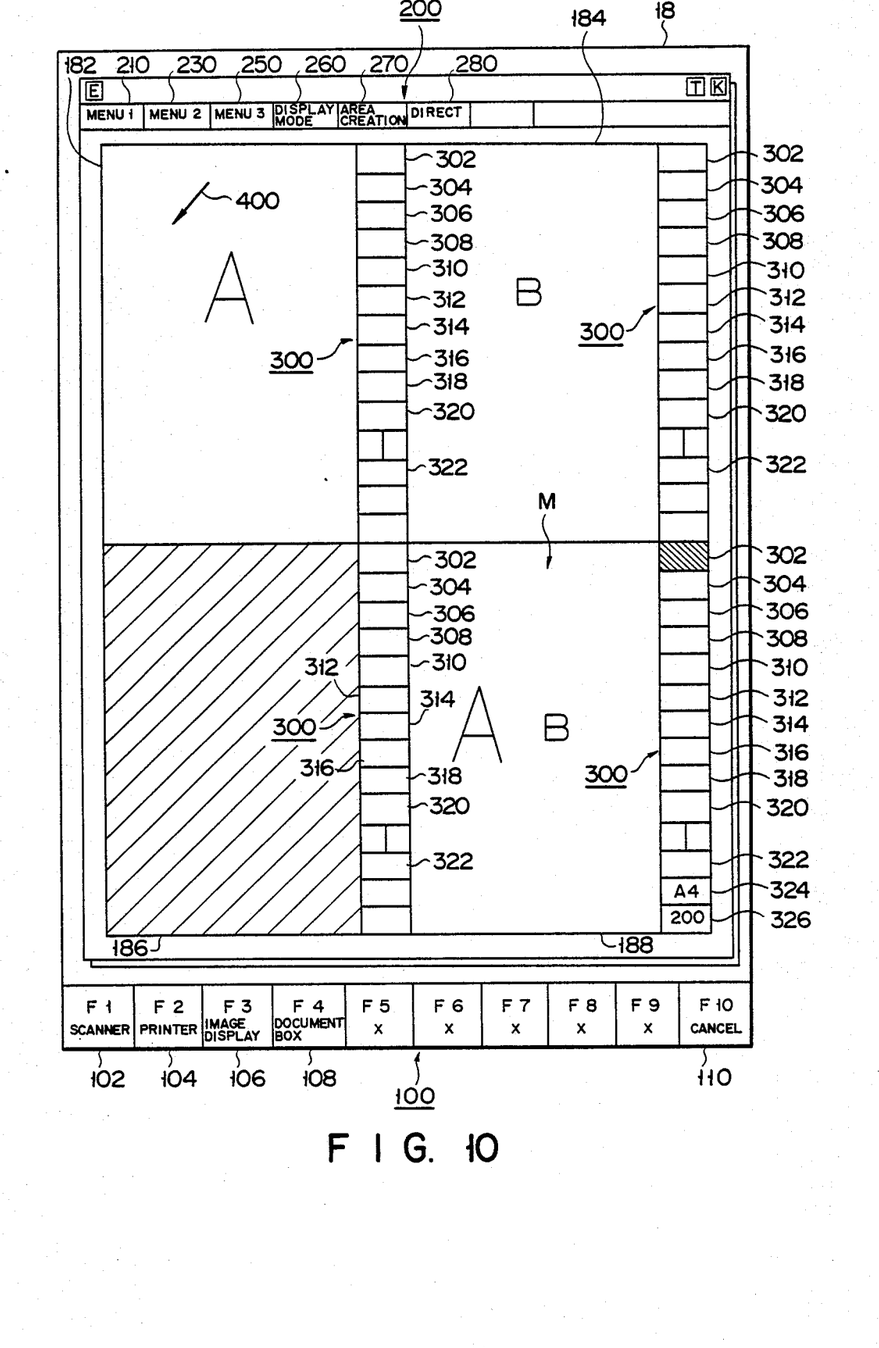
FIG. 10 shows a display state of the CRT display shown in FIG. 5, i.e., is a view showing a state upon completion of the edit operation.

Images "A" and "B" displayed in window 188 are surrounded by frames Fa' and Fb', respectively. In this state, images "A" and "B" can be moved on the screen. More specifically, unless frames Fa' and Fb' are deleted from the screen, images "A" and "B" are not fixed. For this reason, as shown in FIG. 9, icon 222 for designating "paste" is selected and designated from pull down menu 224 by cursor 400. Images stored in other areas of page memory 40 are written at designated paste positions in a mat area in page memory 40. As shown in FIG. 10, frames Fa, Fb, Fa', and Fb' displayed around images "A" and "B" are deleted from windows 182, 184, and 188 of CRT display 18. Therefore, images "A" and "B" on window 188 are fixed to mat M. Thus, the edit operation for enlarging/reducing images "A" and "B" and synthesizing them to be another image is completed.

In the above embodiment, image data displayed on CRT display 18 is enlarged/reduced. However, when characters input through keyboard 16 are added on an image displayed on CRT display 18, the size of the character can be enlarged or reduced in the same manner as described above.

In the above embodiment, an image displayed on CRT display 18 is synthesized with another image. However, the present invention may be applied to a processing mode in the following embodiment.

In the display state shown in FIG. 4, pointing device 20 is operated to cause cursor 400 to designate display mode 260 in designation icons 200. Then, assume that an icon of "menu 1" designating one screen is selected and designated from the pull down menu of display mode icon 260. In the one-window display state, an original is set on scanner 32, and scanner icon 102 and image display icon 106 of common icons 100 are sequentially designated by cursor 400. Then, the original is two-dimensionally read by scanner 32 and is converted into image data. The image data is supplied to page memory 40 via image bus 52. Image memory 40 stores the original image read by scanner 32 without any change in size. The image data stored in page memory 40 is supplied to enlarge/reduction circuit 48 via image bus 52. In the case, CPU 12 determines enlargement/reduction magnifications in accordance with the size of the original read by scanner 32 and the size of a display portion of CRT display 18. The data indicating the determination result is supplied to enlarge/reduction circuit 48 via system bus 14. Enlarge/reduction circuit 48 reduces the data to a size corresponding to CRT display 18, and outputs it to display memory 42 via image bus 52. The image data is stored in display memory 42. The stored image is displayed on CRT display 18 via display controller 54.

The image read by scanner 32 is displayed on CRT display 18. When the image is enlarged or reduced in this state, pointing device 20 is operated to cause cursor 400 to select and designate enlargement icon 306 or reduction icon 308 of designation icons 300. The enlargement or reduction operation is the same as that described above, and a detailed description thereof will be omitted.

The image displayed on CRT display 18 is stored in optical disk 34 as follows. Pointing device 20 is operated to cause cursor 400 to sequentially select and designate image display icon 106 and document box icon 108 from common icons 100 displayed on the screen of CRT display 18. The image displayed on the screen, i.e., image data stored in display memory 42 is stored in page memory 40 via image bus 52. Image data in a mat area stored in page memory 42 is supplied to optical disk device 26 via interface circuit 22. In optical disk device 26, the image data is stored in optical disk 34.

When image data stored in optical disk 34 is to be displayed on CRT display 18, an operation opposite to the operation for storing data in optical disk 34 is performed. More specifically, document box icon 108 and image display icon 106 are selected and designated by cursor 400 from common icons 100 in this order. Then, the image data stored in optical disk 34 is read out by optical disk device 26, and is stored in page memory 40 via interface circuit 22. The image data stored in page memory 40 is stored in display memory 42 via image bus 52 and enlarge/reduction circuit 48, as described above. The image data stored in display memory 42 is supplied to CRT display 18 via display controller 54. In this manner, the image data stored in optical disk 34 can be displayed on CRT display 18.

The edit operation of the image displayed on CRT display 18 has been described in the above embodiment, and a detailed description thereof will be omitted.

When an image displayed on CRT display, e.g., an image of mat M shown in FIG. 10 is printed by printer 56, image display icon 106 and printer icon 104 of common icons 100 are sequentially selected and designated by cursor 400. The image in mat M area stored in page memory 40 is supplied to the printer via enlarge/reduction circuit 48, interface circuit 60, and the like. The printer then prints out the image.

According to the present invention as described above, enlargement/reduction having different vertical and horizontal magnifications of a character or an image can be performed. When the character or the image is to be edited, the character or the image can be displayed in an arbitrary area. The enlarged/reduced character or reduced may be output not only by a CRT display but also by a printer.

What is claimed is:

1. A data processing apparatus comprising:
    means for displaying data to be processed;
    first designating means for designating an amount of either an enlarging or reducing magnification ratio in a vertical direction of said data displayed on said displaying means;
    second designating means for designating an amount of either an enlarging or reducing magnification ratio in a horizontal direction of said data displayed on said display means; and
    means for changing a displayed size of said data displayed on said displaying means in accordance with said amount of either the enlarging or reducing magnification ratio in a vertical direction designated by said first designating means and said amount of either the enlarging or reducing magnification ratio in the horizontal direction designated by said designating means;
    wherein said first designating means includes;
    means for generating first conversion ratio data representing either the enlarging or reducing ratio in the vertical direction of said data;
    first conversion ratio memory means for storing the first conversion ratio data;
    fixing means for calculating first physical positions of pixels of the data before either enlargement or reduction operation of the data is performed, calculating second vertical positions of the pixels of the data after either the enlargement or reduction operation of the data is performed in accordance with the first vertical positions of the pixels and the first conversion ratio, and calculating either an enlargement or reduction ratio of the data to obtain vertical position determination signals; and computing means for computing vertical position data of object pixels after either the enlargement or reduction of the data is performed based on the vertical position determination signals and vertical reference pixels extracted from the pixels of the data before either the enlargement or reduction of the data is performed; and wherein said second designating means includes:

means for generating second conversion ratio data representing either the enlarging or reducing ratio in the horizontal direction of said data;

second conversion ratio memory means for storing the second conversion ratio data;

fixing means for calculating first horizontal positions of pixels of the data before either enlargement or reduction operation of the data is performed, calculating second horizontal positions of the pixels of the data after either the enlargement or reduction operation of the data is performed in accordance with the first horizontal positions of the pixels and the second conversion ratio, and calculating either an enlargement or reduction ratio of the data to obtain horizontal position determination signals; and computing means for computing horizontal position data of object pixels after either the enlargement or reduction of the data is performed based on the horizontal position determination signals and horizontal reference pixels extracted from the pixels of the data before either the enlargement or reduction of the data is performed.

2. A data processing apparatus according to claim 1, wherein said computing means is provided to compute color data indicating colors of the object pixels.

3. An apparatus according to claim 2, wherein said color data indicating colors of the object pixels represent either black or white.

4. An apparatus according to claim 1, which further comprises line memory means for storing predetermined lines of data to be processed; and means for extracting said referenced pixels from the data stored in the first line memory means.

5. An apparatus according to claim 1, which further comprises means for repetitively outputting the computed position and color data of the object pixels for a predetermined number of times.

6. An apparatus according to claim 5, wherein said repetitively outputting means includes counter means for counting said predetermined number of times.

7. A data processing apparatus comprising:
means for inputting data to be processed;
means for displaying said data input by said inputting means;
first designating means for designating an amount of either an enlarging or reducing magnification ratio in a vertical direction of said data displayed on said displaying means;
second designating means for designating an amount of either an enlarging or reducing magnification ratio in a horizontal direction of said data displayed on said displaying means;
means for changing a displayed size of said data displayed on said displaying means in accordance with said amount of either the enlarging or reducing magnification ratio in the vertical direction designated by said first designating means and said amount of either the enlarging or reducing magnification ratio in the horizontal direction designated by said second designating means; and means for storing enlarged or reduced data displayed on said display means;

wherein said first designating means includes:

means for generating first conversion ratio data representing either the enlarging or reducing ratio in the vertical direction of said data;

first conversion ratio memory means for storing the first conversion ratio data;

fixing means for calculating first vertical positions of pixels of the data before either enlargement or reduction operation of the data is performed, calculating second vertical positions of the pixels of the data after either the enlargement or reduction operation of the data is performed in accordance with the first vertical positions of the pixels and the first conversion ratio, and calculating either an enlargement or reduction ratio of the data to obtain vertical position determination signals; and computing means for computing vertical position data of object pixels after either the enlargement or reduction of the data is performed based on the vertical position determination signals and vertical reference pixels extracted from the pixels of the data before either the enlargement or reduction of the data is performed; and wherein said second designating means includes:

means for generating second conversion ratio data representing either the enlarging or reducing ratio in the horizontal direction of said data;

second conversion ratio memory means for storing the second conversion ratio data;

fixing means for calculating first horizontal positions of pixels of the data before either enlargement or reduction operation of the data is performed, calculating second horizontal positions of the pixels of the data after either the enlargement or reduction operation of the data is performed in accordance with the first horizontal positions of the pixels and the second conversion ratio, and calculating either an enlargement or reduction ratio of the data to obtain horizontal position determination signals; and computing means for computing horizontal position data of object pixels after either the enlargement or reduction of the data is performed based on the horizontal position determination signals and horizontal reference pixels extracted from the pixels of the data before either the enlargement or reduction of the data is performed.

8. An apparatus according to claim 7, wherein said display means can simultaneously display a plurality of images.

9. An apparatus according to claim 7, wherein said storage means comprises an optical disk.

10. A data processing apparatus according to claim 7, wherein said computing means is provided to compute color data indicating colors of the object pixels.

11. An apparatus according to claim 10, wherein said color data indicating colors of the object pixels represent either black or white.

12. An apparatus according to claim 7, which further comprises line memory means for storing predetermined lines of data to be processed; and
   means for extracting said reference pixels from the data stored in the first line memory means.

13. An apparatus according to claim 7, which further comprises means for repetitively outputting the computed position and color data of the object pixels for a predetermined number of times.

14. An apparatus according to claim 13, wherein said repetitively outputting means include counter means for counting said predetermined number of times.

15. A data processing apparatus comprising:
   means for storing data corresponding to an image to be processed;
   means for displaying said data to be processed;
   first designating means for designating an amount of either an enlarging or reducing magnification ratio in a vertical direction of said data displayed on said displaying means;
   second designating means for designating an amount of either an enlargin or reducing magnification ratio in a horizontal direction of said data displayed on said displaying means;
   means for changing a displayed size of said data displayed on said displaying means in accordance with said amount of either the enlarging or reducing magnification ratio in the vertical direction designated by said first designating means and said amount of either the enlarging or reducing magnification ratio in the horizontal direction designated by said designating means; and
   means for printing an image corresponding to the data which are either enlarged or reduced at individual magnification;
   wherein said first designating means includes:
      means for generating first conversion ratio data representing either the enlarging or reducing ratio in the vertical direction of said data;
      first conversion ratio memory means for storing the first conversion ratio data;
      fixing means for calculating first vertical positions of pixels of the data before either enlargement or reduction operation of the data is performed, calculating second vertical positions of the pixels of the data after either the enlargement or reduction operation of the data is performed in accordance with the first vertical positions of the pixels and the first conversion ratio, and calculating either an enlargement or reduction ratio of the data to obtain vertical position determination signals; and
      computing means for computing vertical position data of object pixels after either the enlargement or reduction of the data is performed based on the position determination signals and vertical reference pixels extracted from the pixels of the data before either the enlargement or reduction of the data is performed; and
   wherein said second designating means includes:
      means for generating second conversion ratio data representing either the enlarging or reducing ratio in the horizontal direction of said data;
      second conversion ratio memory means for storing the second conversion ratio data;
      fixing means for calculating first horizontal positions of pixels of the data before either enlargement or reduction operation of the data is performed, calculating second horizontal positions of the pixels of the data after either the enlargement or reduction operation of the data is performed in accordance with the first horizontal position of the pixels and the second conversion ratio, and calculating either an enlargement or reduction ratio of the data to obtain horizontal position determination signals; and
      computing means for computing horizontal position data of object pixels after either tho enlargement or reduction of the data is performed based on the position determination signals and horizontal reference pixels extracted from the pixels of the data before either the enlargement or reduction of the data is performed.

16. An apparatus according to claim 15, wherein said storage means comprises an optical disk.

17. An apparatus according to claim 15, wherein said display means can simultaneously display a plurality of images.

18. An apparatus according to claim 15, wherein said computing means is provided to compute color data indicating colors of the object pixels.

19. An apparatus according to claim 18, wherein said color data indicating colors of the object pixels represent either black or white.

20. An apparatus according to claim 15, which further comprises line memory means for storing predetermined lines of data to be processed; and
   means for extracting said referenced pixels from the data stored in the first line memory means.

21. An apparatus according to claim 15, which further comprises means for repetitively outputting the computed position and color data of the object pixels for a predetermined number of times.

22. An apparatus according to claim 21, wherein said repetitively outputting means include counter means for counting said predetermined number of times.

* * * * *